US010762905B2

(12) United States Patent
Vaquero Avilés-Casco et al.

(10) Patent No.: US 10,762,905 B2
(45) Date of Patent: Sep. 1, 2020

(54) SPEAKER VERIFICATION

(71) Applicant: Cirrus Logic International Semiconductor Ltd., Edinburgh (GB)

(72) Inventors: Carlos Vaquero Avilés-Casco, Madrid (ES); David Martínez González, Saragossa (ES)

(73) Assignee: Cirrus Logic, Inc., Austin, TX (US)

( * ) Notice: Subject to any disclaimer, the term of this patent is extended or adjusted under 35 U.S.C. 154(b) by 136 days.

(21) Appl. No.: 16/050,497

(22) Filed: Jul. 31, 2018

(65) Prior Publication Data

US 2020/0043503 A1 Feb. 6, 2020

(51) Int. Cl.
*G10L 17/04* (2013.01)
*G10L 15/22* (2006.01)
*G10L 15/20* (2006.01)

(52) U.S. Cl.
CPC .............. *G10L 17/04* (2013.01); *G10L 15/20* (2013.01); *G10L 15/22* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,933,973 A * | 6/1990 | Porter | ...................... | G10L 15/20 704/233 |
| 5,970,446 A * | 10/1999 | Goldberg | ................ | G10L 15/20 704/233 |
| 6,381,569 B1 * | 4/2002 | Sih | .......................... | G10L 15/20 704/233 |
| 6,393,397 B1 * | 5/2002 | Choi | ........................ | G10L 17/04 704/238 |
| 6,411,927 B1 * | 6/2002 | Morin | .................... | G10L 15/065 704/224 |
| 6,519,563 B1 * | 2/2003 | Lee | .......................... | G10L 17/04 704/246 |
| 6,631,348 B1 * | 10/2003 | Wymore | .................. | G10L 15/20 704/233 |
| 6,754,628 B1 * | 6/2004 | Chaudhari | .............. | G10L 17/12 704/203 |
| 6,990,446 B1 * | 1/2006 | Huang | .................... | G10L 17/04 381/94.1 |
| 2003/0171931 A1 * | 9/2003 | Chang | ..................... | G10L 15/07 704/275 |
| 2007/0198257 A1 * | 8/2007 | Zhang | ..................... | G10L 17/20 704/233 |
| 2009/0119103 A1 * | 5/2009 | Gerl | ........................ | G10L 17/04 704/243 |
| 2017/0061970 A1 * | 3/2017 | Escott | ..................... | G10L 17/20 |

* cited by examiner

*Primary Examiner* — Abul K Azad
(74) *Attorney, Agent, or Firm* — Jackson Walker L.L.P.

(57) ABSTRACT

A method for use in speaker verification, comprises: receiving a sample of a person's speech; estimating a noise measure in the received sample of the person's speech; if the estimated noise measure does not meet a predetermined criterion, rejecting the received sample of the person's speech; and if the estimated noise measure meets the predetermined criterion: adding noise to the received sample to form a sample with increased noise; extracting features of the sample with increased noise; and forming a model of the person's speech from the extracted features.

17 Claims, 6 Drawing Sheets

SPEAKER VERIFICATION

TECHNICAL FIELD

This disclosure relates to the field of speaker verification, and in particular relates to forming a model of an enrolling user's speech, and subsequently using that model for comparison during a verification stage.

BACKGROUND

This disclosure relates to a speaker recognition system. One aim of a speaker recognition system may be to verify that a speaker is who they claim to be, that is, to perform speaker verification. Such a system requires a user to enrol into the system by providing a speech sample, which is used to create a model of the user's speech. Subsequent attempts by a speaker to access the system are then compared with the model created during enrolment.

In a speaker recognition system, the process of calibration aims to ensure that the system operates at a desired operating point across all environmental conditions (for example, across all noise measures and across all channels). The desired operating point can be defined as the False Acceptance Rate (FAR) of the system. The FAR can then be adjusted depending on the security level required by the speaker recognition system at the time.

In situations where the environmental conditions are not ideal, it is desirable that this is only reflected in an increase of the False Rejection Rate (FRR) of the system, without a change in the FAR (which may seriously impact the security of the speaker recognition system).

The presence of background noise can result in calibration problems in a speaker recognition system, such that the speaker recognition system does not obtain the desired FAR.

An attempt to solve this problem is the use of test normalization, or T-Normalization. The speech of a speaker attempting to access the system is compared with the model obtained during enrolment, and is also compared with the models of a cohort of other speakers. The statistics of the scores obtained from the comparisons with the cohort are used to modify the score obtained from the comparison with the model obtained during enrolment, and the modified score is used as the basis for the decision as to whether the speaker is the enrolled user. Theoretically, T-Normalization guarantees that the FAR will remain stable, regardless of the environmental conditions when a speaker accesses the speaker recognition system. However, this will only occur when the environmental conditions of the cohort, and the environmental conditions of the enrolment, are identical. Thus, this stabilisation of the FAR is often not possible, as it is not possible to predict the environmental conditions that will be present when a speaker enrols into the speaker verification system.

SUMMARY

According to an aspect of the disclosure, there is provided a method for use in speaker verification, comprising:
  receiving a sample of a person's speech;
  estimating a noise measure in the received sample of the person's speech;
  if the estimated noise measure does not meet a predetermined criterion, rejecting the received sample of the person's speech; and
  if the estimated noise measure meets the predetermined criterion:
    adding noise to the received sample to form a sample with increased noise;
    extracting features of the sample with increased noise; and
    forming a model of the person's speech from the extracted features.

Adding noise to the received sample to form a sample with increased noise and extracting features of the sample with increased noise may comprise:
  adding noise to the received sample; and
  subsequently performing a feature extraction process on the received sample with added noise.

Adding noise to the received sample to form a sample with increased noise and extracting features of the sample with increased noise may comprise:
  performing a fast Fourier transform on the received sample;
  adding noise to a result of the fast Fourier transform; and
  subsequently performing a feature extraction process on the result of the fast Fourier transform with added noise.

Adding noise to the received sample to form a sample with increased noise and extracting features of the sample with increased noise may comprise:
  performing a fast Fourier transform on the received sample;
  applying a result of the fast Fourier transform to a Mel filter bank;
  adding noise to an output of the Mel filter bank; and
  subsequently performing a feature extraction process on the output of the Mel filter bank with added noise.

When the person is an enrolling user, the method may further comprise:
  performing speaker verification by comparing a received sample of speech with the model of the person's speech.

The method may comprise:
  performing the method for a plurality of people to obtain respective models of those people's speech;
  obtaining a model of an enrolling user's speech; and
  performing speaker verification by comparing a received sample of speech with the model of the enrolling user's speech and with the respective models formed for said plurality of people.

The noise measure may be an absolute noise measure, for example a total absolute noise level or a measure of noise in a plurality of frequency bands.

Alternatively, the noise measure may be a signal to noise ratio.

Adding noise to the received sample may comprise:
  adding a predetermined form of noise.

Alternatively, adding noise to the received sample may comprise:
  adding noise in a form that depends on the received sample of the person's speech.

For example, adding noise to the received sample may comprise:
  adding noise in a form that depends on a frequency spectrum of the received sample of the person's speech.

Alternatively, adding noise to the received sample may comprise:
  adding noise in a form that depends on a measure of energy of the received sample of the person's speech.

The method may comprise performing the method for a plurality of people to obtain respective models of those people's speech, in which case adding noise to each received sample may comprise:

receiving a sample of an enrolling user's speech; and estimating a noise measure in the received sample of the enrolling user's speech, and wherein the noise added to each received sample is determined based on the estimated noise measure in the received sample of the enrolling user's speech.

According to another aspect of the invention, there is provided a method for use in speaker verification, comprising:

receiving a sample of a person's speech;

adding noise to the received sample to form a sample with increased noise;

extracting features of the sample with increased noise; and comparing the extracted features with a model of the person's speech.

Adding noise to the received sample to form a sample with increased noise and extracting features of the sample with increased noise may comprise:

adding noise to the received sample; and subsequently performing a feature extraction process on the received sample with added noise.

Adding noise to the received sample to form a sample with increased noise and extracting features of the sample with increased noise may comprise:

performing a fast Fourier transform on the received sample;

adding noise to a result of the fast Fourier transform; and subsequently performing a feature extraction process on the result of the fast Fourier transform with added noise.

Adding noise to the received sample to form a sample with increased noise and extracting features of the sample with increased noise may comprise:

performing a fast Fourier transform on the received sample;

applying a result of the fast Fourier transform to a Mel filter bank;

adding noise to an output of the Mel filter bank; and subsequently performing a feature extraction process on the output of the Mel filter bank with added noise.

The noise measure may be an absolute noise measure, for example a total absolute noise level or a measure of noise in a plurality of frequency bands.

Alternatively, the noise measure may be a signal to noise ratio.

Adding noise to the received sample may comprise:

adding a predetermined form of noise.

Alternatively, adding noise to the received sample may comprise:

adding noise in a form that depends on the received sample of the person's speech.

For example, adding noise to the received sample may comprise:

adding noise in a form that depends on a frequency spectrum of the received sample of the person's speech.

Alternatively, adding noise to the received sample may comprise:

adding noise in a form that depends on a measure of energy of the received sample of the person's speech.

According to other aspects of the invention, there are provided devices and apparatus configured to perform one or more of these methods.

According to another aspect of the invention, there is provided a computer program product, comprising computer-readable code, containing instructions for causing a device to perform one or more of these methods.

BRIEF DESCRIPTION OF DRAWINGS

For a better understanding of the invention, and to show more clearly how it may be carried into effect, reference will now be made, by way of example only, to the accompanying drawings in which.

DETAILED DESCRIPTION

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

Figure 1:
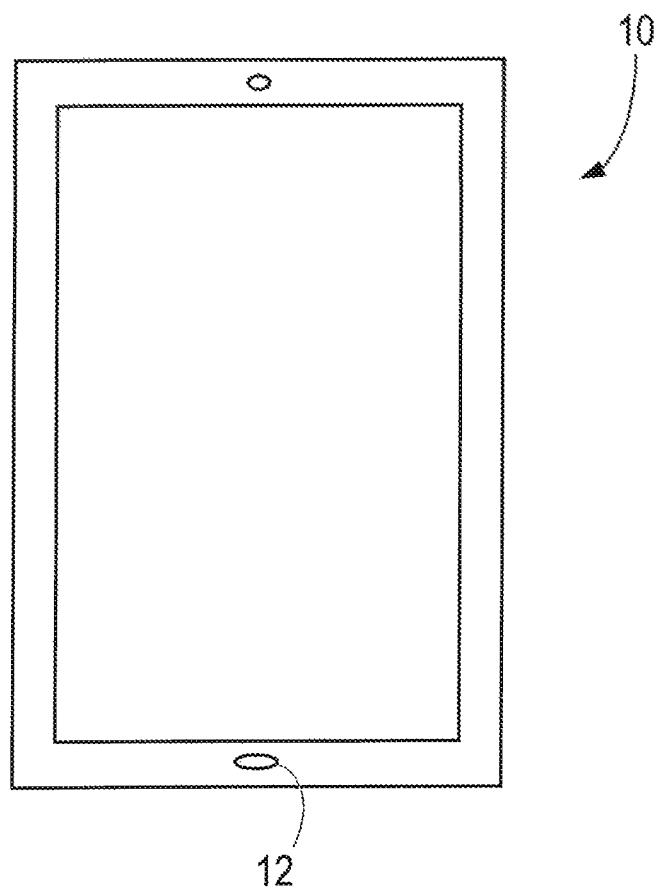
FIG. 1 shows a smartphone.

FIG. 1 illustrates a smartphone 10, having a microphone 12 for detecting sounds. The smartphone 10 is just one example of an electronic device in which the methods described herein can be performed. The methods can similarly be performed in another portable electronic device, such as a tablet or laptop computer, a games console, a home control system, a home entertainment system, an in-vehicle entertainment system, or a domestic appliance.

Figure 2:
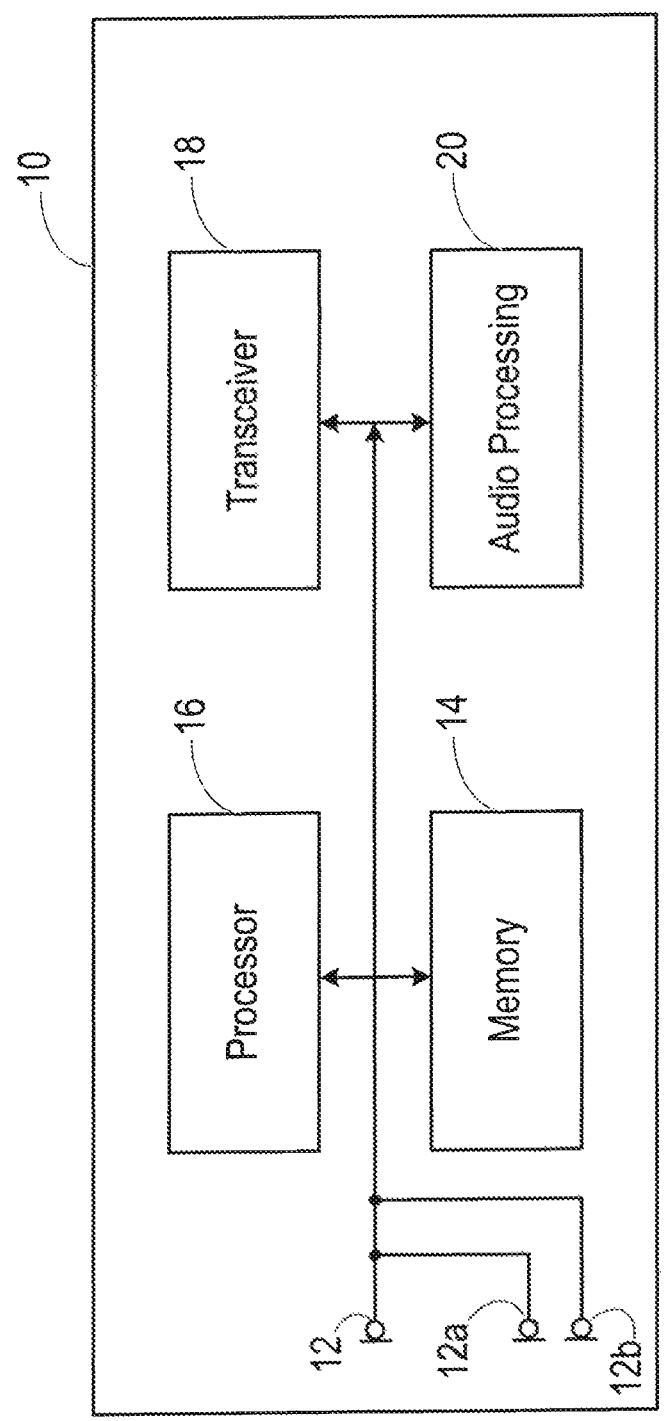
FIG. 2 is a schematic diagram of the smartphone.

FIG. 2 is a schematic diagram, illustrating the form of the smartphone 10.

Specifically, FIG. 2 shows various interconnected components of the smartphone 10. It will be appreciated that the smartphone 10 will in practice contain many other components, but the following description is sufficient for an understanding of the present invention.

Thus, FIG. 2 shows the microphone 12 mentioned above. In certain embodiments, the smartphone 10 is provided with multiple microphones 12, 12a, 12b, etc.

FIG. 2 also shows a memory 14, which may in practice be provided as a single component or as multiple components. The memory 14 is provided for storing data and program instructions.

FIG. 2 also shows a processor 16, which again may in practice be provided as a single component or as multiple components. For example, one component of the processor 16 may be an applications processor of the smartphone 10.

FIG. 2 also shows a transceiver 18, which is provided for allowing the smartphone 10 to communicate with external networks. For example, the transceiver 18 may include circuitry for establishing an internet connection either over a WiFi local area network or over a cellular network.

FIG. 2 also shows audio processing circuitry 20, for performing operations on the audio signals detected by the microphone 12 as required. For example, the audio processing circuitry 20 may filter the audio signals or perform other signal processing operations.

In this embodiment, the smartphone 10 is provided with speaker recognition functionality, and with control functionality. Thus, the smartphone 10 is able to perform various functions in response to spoken commands from an enrolled user. The speaker recognition functionality is able to distinguish between spoken commands from an enrolled user, and the same commands when spoken by a different person. Thus, certain embodiments of the invention relate to operation of a smartphone or another portable electronic device with some sort of voice operability, for example a tablet or laptop computer, a games console, a home control system, a home entertainment system, an in-vehicle entertainment system, a domestic appliance, or the like, in which the speaker recognition functionality is performed in the device that is intended to carry out the spoken command. Certain other embodiments relate to systems in which the speaker recognition functionality is performed on a smartphone or other device, which then transmits the commands to a separate device if the speaker recognition functionality is able to confirm that the speaker was an enrolled user.

In some embodiments, while speaker recognition functionality is performed on the smartphone 10 or other device that is located close to the user, the spoken commands are transmitted using the transceiver 18 to a remote speech recognition system, which determines the meaning of the spoken commands. For example, the speech recognition system may be located on one or more remote server in a cloud computing environment. Signals based on the meaning of the spoken commands are then returned to the smartphone 10 or other local device.

Figure 3:
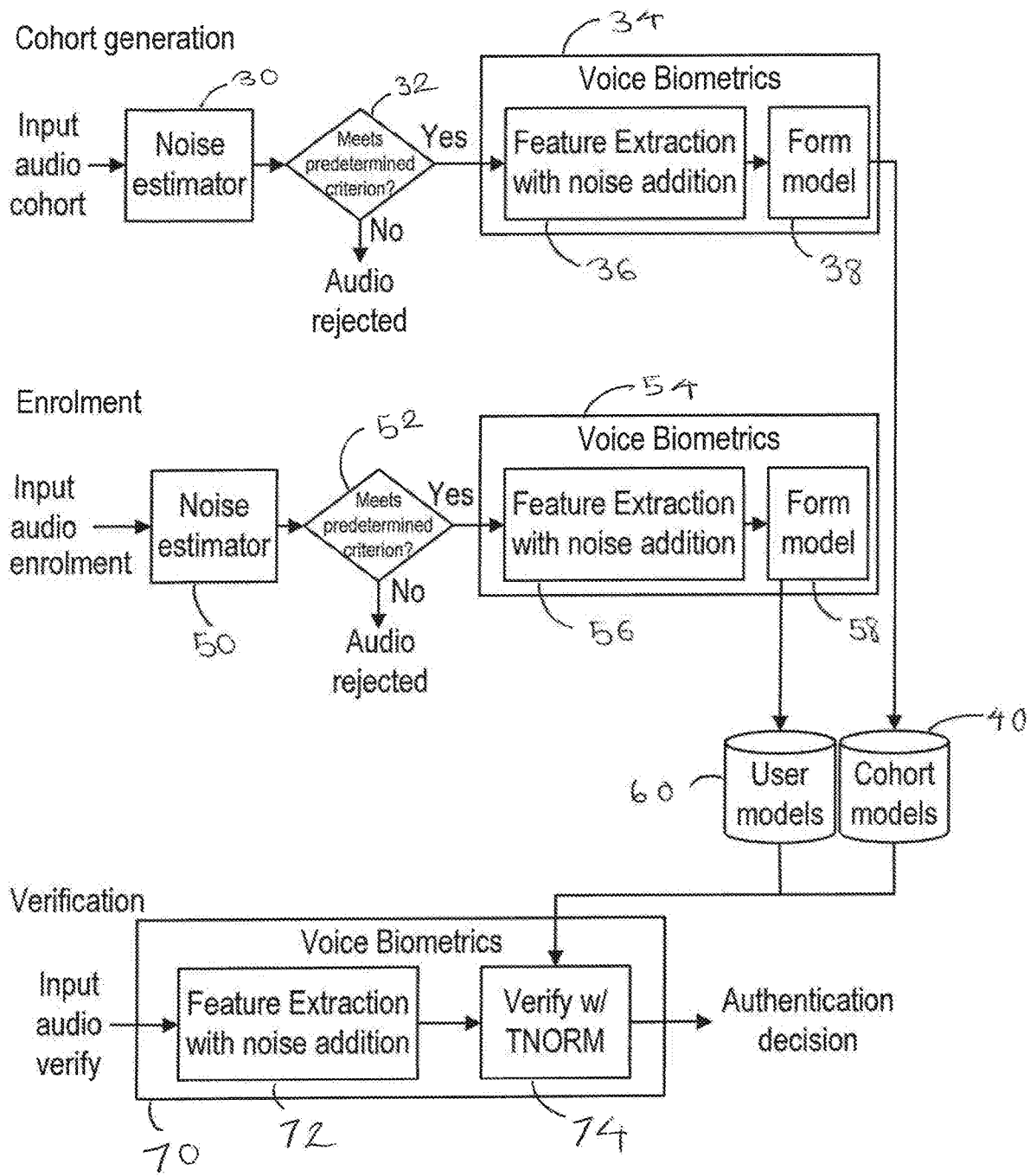
FIG. 3 is a block diagram, illustrating the functional blocks in a speaker verification system.
Figure 4:
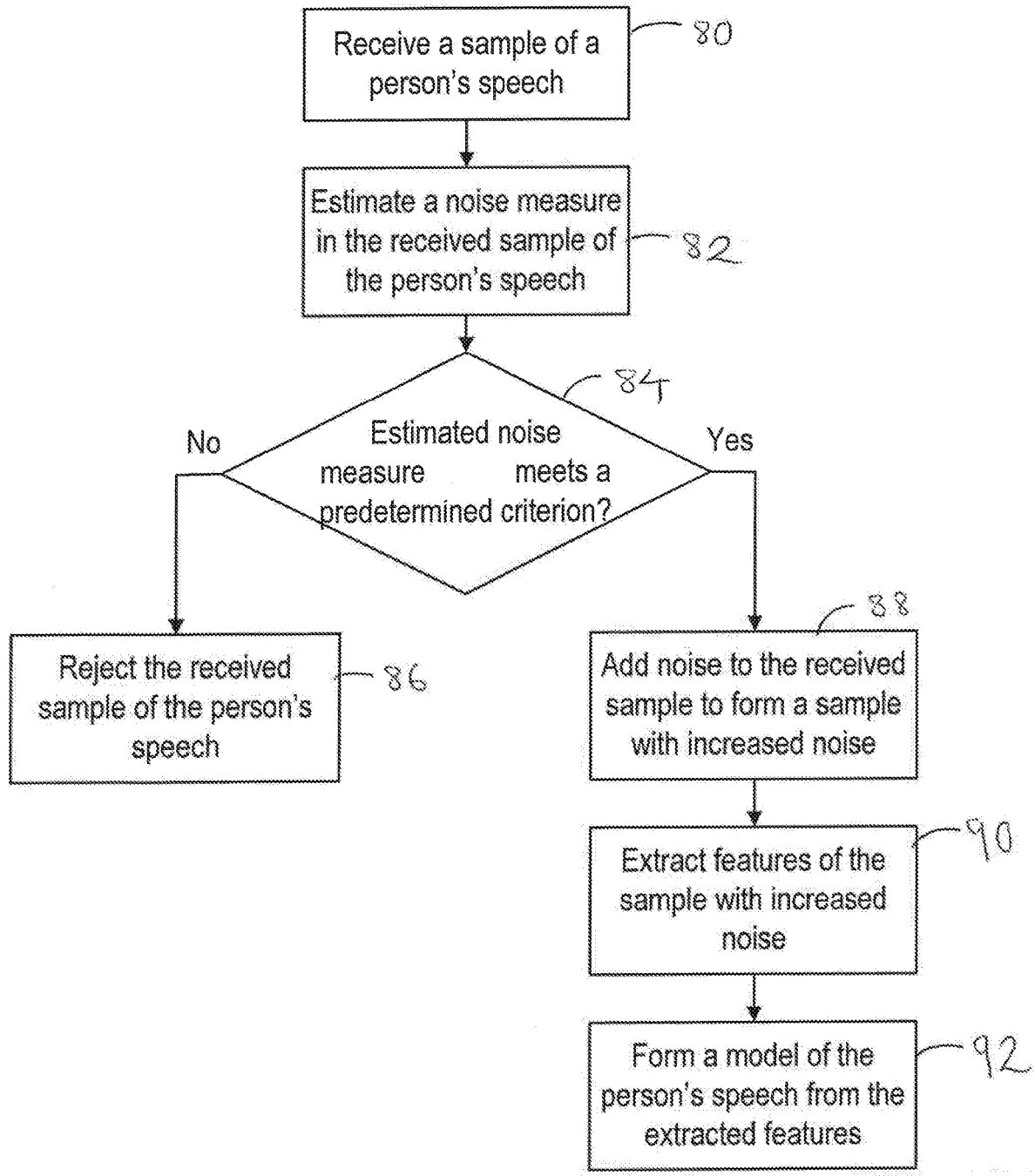
FIG. 4 is a flow chart, illustrating a method.

FIG. 3 is a block diagram illustrating the functional blocks in a speaker verification system, and FIG. 4 is a flow chart, illustrating a method for use in speaker verification. The method of FIG. 4 may be implemented as part of a cohort generation process, or may be implemented as part of an enrolment process. In a cohort generation process, a large number of people are selected, and each of them produces a speech sample. Provided that the speech sample meets certain conditions (as described below), a model is formed of that person's speech. In an enrolment process, an enrolling user produces a speech sample. Provided that the speech sample meets certain conditions (as described below), a model is formed of the enrolling user's speech. In a verification process, a speaker produces a speech sample. This speech sample is compared with the model of the enrolled user's speech, and with the models of the cohort, and it is determined whether the similarity between the speech sample and the model of the enrolled user's speech means that the speaker can be considered to be the enrolled user.

Certain functional blocks in the system of FIG. 3 may be configured to perform a cohort generation process, as described below.

As shown in FIG. 3, an input audio signal is received by the system of FIG. 3, and is passed to a noise estimator 30. The input audio signal may have been generated by a microphone, for example, one of the microphones in the smartphone 10. The input audio signal may represent a sample of a person's speech.

Thus, in step 80 of the process shown in FIG. 4, the system of FIG. 3 receives a sample of a person's speech.

The noise estimator 30 estimates a noise measure of the received sample of the person's speech. The noise estimator 30 may be configured to estimate any suitable noise measure in the received sample of the person's speech. Examples of suitable noise measures include an estimation of the noise signal itself, the absolute noise level, the signal-to-noise ratio (SNR), the absolute noise level in each of a plurality of frequency bands, and the SNR per band. The noise measure may be any combination of metrics or information related to the noise present in the received sample.

Thus, in step 82 of the process shown in FIG. 4, the system of FIG. 3 estimates a noise measure in the received sample of the person's speech.

The estimated noise measure is then passed to a thresholding gate 32. The thresholding gate 32 determines if the estimated noise measure meets a predetermined criterion. The predetermined criterion may be fixed, or the predetermined criterion may be modifiable. The predetermined criterion will be related to the type of noise measure that is estimated by the noise estimator 30. For example, if the noise measure is an absolute noise level, the predetermined criterion may be a threshold level, and the block 32 may determine whether the noise level is below the threshold level. As another example, if the noise measure is a signal-to-noise ratio, the predetermined criterion may again be a threshold level, and in this case the block 32 may determine whether the signal-to-noise ratio exceeds the threshold level. As another example, if the noise measure is the absolute noise level or SNR in each of a plurality of frequency bands, the predetermined criterion may again be a threshold level, or a respective threshold level for each frequency band, and the predetermined criterion may determine if the absolute noise level in every band is below the threshold level for that band. Alternatively, if the noise measure is the absolute noise level or SNR in each of a plurality of frequency bands, a respective threshold level may be set for each frequency band. A comparison may be made between the noise measure and the threshold level in every band, and the predetermined criterion may combine the results of these comparisons (for example weighting the results of the comparison in each band differently accordingly to the importance of that band in the task of speaker verification), and compare the combined result with a further threshold.

As a further example, if the noise measure is the absolute noise level in each of a plurality of frequency bands, the predetermined criterion may determine if a frequency profile of the noise in the received sample of the person's speech is similar to a predetermined known noise profile stored in a database that may contain multiple known noise profiles.

Thus, in step 84 of the process of FIG. 4, the system of FIG. 3 determines if the estimated noise measure meets a predetermined criterion.

If the thresholding gate 32 determines that the estimated noise measure does not meet a predetermined criterion, the received sample of the person's speech is rejected. Thus, the predetermined criterion applied by the thresholding gate 32 is generally set such that samples with unsuitable noise profiles are rejected. For example, the predetermined criterion may be set such that samples with generally excessive levels of noise, or with noise levels or types that cannot be masked effectively, meaning that later speaker verification would be difficult, are rejected.

Thus, in step 86 of the process of FIG. 4, if the estimated noise measure does not meet a predetermined criterion, the system of FIG. 3 rejects the received sample of the person's speech.

Thus, speech samples that do not meet the predetermined criterion, for example because they contain excessive amounts of noise or unusual types of noise, are rejected, and are not used in forming the models of the cohort.

If the thresholding gate 32 determines that the estimated noise measure meets the predetermined criterion, the received sample of the person's speech is passed to a voice biometrics block 34.

The voice biometrics block comprises a feature extraction and noise addition block 36, and a model formation block 38. The received sample of the person's speech is passed to the feature extraction and noise addition block 36, where noise is added to the received sample of the person's speech to form a sample with increased noise. The noise that is added to the received sample may be a predefined noise. The noise that is added to the received sample may be variable, depending on the absolute noise level in the received sample, or depending on the frequency profile of the noise in the received sample. The noise that is added to the received sample may be variable such that the sample with increased noise has a specific absolute noise level. The noise that is added to the received sample may be variable, depending on the signal level in the received sample and/or on the absolute noise level in the received sample, such that the sample with increased noise has a specific SNR. The noise that is added to the received sample may be variable such that the sample with increased noise has a specific frequency profile. When the predetermined criterion applied in step 84 determines whether a frequency profile of the noise in the received sample of the person's speech is similar to a predetermined known noise profile, the noise that is added to the received sample may be matched to that specific known noise profile. In general, the noise that is added will be complementary to the profile of the noise in the received sample. For example, in some embodiments, it may be considered desirable for the total noise to have a generally flat frequency spectrum. Then, if, for example, the input sample is obtained while the speaker is in a moving car, and the resulting noise has a very high noise level at low frequencies, and a low noise level at high frequencies, the noise that is added to the received sample may compensate for this adding a noise profile that has a complementary spectrum, with low or no noise at low frequencies, and a higher noise level at high frequencies.

This addition of noise to the received sample will mask any low level background noise that is already present in the received sample. Thus, by adding the noise to each sample received by the system of FIG. 3 in a cohort generation process, each of said samples will contain a similar level of background noise (i.e. the dominant background noise will be that added by the system of FIG. 3, and thus the noise type and noise level will be known). As noted above, speech samples that contain excessive noise levels have already been rejected. The feature extraction and noise addition block 36 may be configured to add noise to the received sample at any point in the feature extraction process that is performed by the block 36. The feature extraction and noise addition process is explained in detail below.

Figure 5:
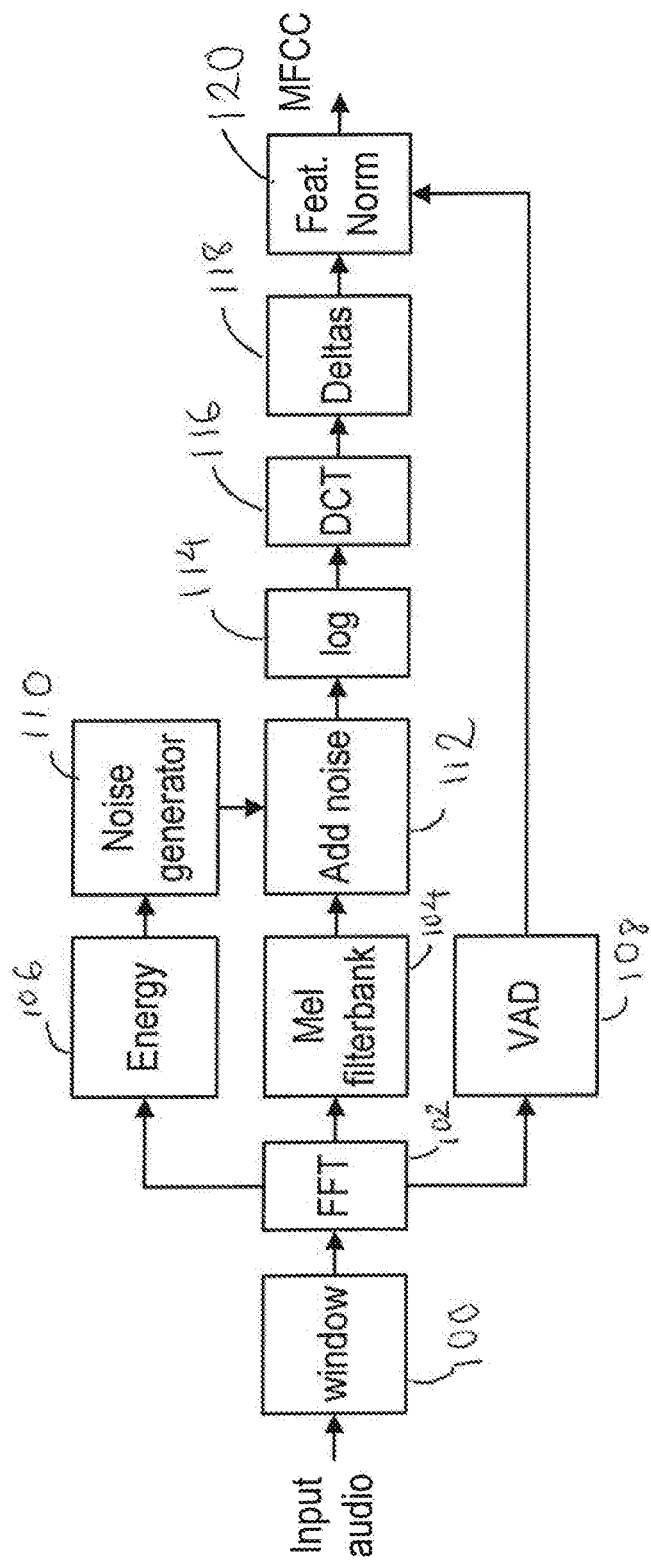
FIG. 5 is a block diagram, illustrating the functional blocks in one embodiment of an integrated feature extraction and noise addition block from the system of FIG. 3.

FIG. 5 is a block diagram illustrating the functional blocks in one embodiment of a feature extraction and noise addition block. The arrangement shown in FIG. 5 is one possible embodiment of the feature extraction and noise addition blocks 36, 56, and 72 as shown in the system of FIG. 3. Specifically, FIG. 5 shows an example in which the features that are extracted from the speech are Mel frequency cepstral coefficients (MFCCs).

In the system of FIG. 5, a received sample of a person's speech is first passed to a windowing block 100. The windowing block 100 divides the received sample of a person's speech into short frames. The frames may be between 20 ms and 40 ms in length. The frames of the received sample of a person's speech are then passed to a fast Fourier transform (FFT) block 102. For each frame of the received sample, the fast Fourier transform block 102 performs a fast Fourier transform on the received sample. The result of the fast Fourier transform is a frequency spectrum. The result of the fast Fourier transform is then passed to a Mel filter bank 104. The Mel filter bank 104 may apply band-pass filters, with spacing and centre frequencies based on the Mel scale, to the result of the fast Fourier transform. The result of the fast Fourier transform may also be passed to an energy measurement block 106. The result of the fast Fourier transform may also be passed to a voice activity detector (VAD) 108. The VAD 108 may perform a voice activity detection process on the result of the fast Fourier transform. The VAD 108 may then use this result to determine which of the frames of the received sample contain speech. The VAD 108 may be configured to operate on the received sample prior to it undergoing any further processing by the system of FIG. 5. Alternatively, the VAD 108 may be configured to operate on the sample with increased noise. The VAD 108 may be configured to operate on a received signal in the time domain, or may be configured to operate on a received signal in the spectral domain.

The energy measurement block 106 may perform a measure of the energy of the result of the fast Fourier transform. The energy measurement block 106 may then use this measurement to determine a measure of the energy in each frequency band of the received sample of the person's speech. The measure of energy of the received sample of the person's speech may be passed to a noise generator 110. Although not shown in FIG. 5, the output of the VAD 108 may be supplied as an input to the energy measurement block 106. Specifically, the energy measurement block 106 could then be used to obtain separate measurements of the energy in frames that contain speech and in frames that only contain noise.

The noise generator 110 may then generate a noise. The noise may be a random noise, or may be a predetermined form of noise. The noise may have a specified power spectral density (for example, the noise may be white, red, or blue noise). The noise may have a specified energy or power level.

The noise may have a form that is dependent on the received sample of the person's speech. Specifically, the noise may have a form that is dependent on a frequency spectrum of the received sample of a person's speech. The noise may have a form that is dependent on a measure of energy of the received sample of a person's speech.

In other examples, the noise that is added to the received sample of a person's speech may have a form that is dependent on a measure of energy of a received sample of one or more different persons' speech. For example, in a speaker verification process as shown in FIG. 3, verification is performed by comparing a sample of speech with a model of a previously enrolled speaker's speech, and with a number of cohort models. It has been found that this process works most satisfactorily if the speech samples used for the speaker model and for the cohort models have similar noise profiles. This may be achieved either by adding noise to the sample of the enrolling speaker's speech so that it corresponds to the noise in the samples of the speakers used in the cohort, or by adding noise to the samples of the speech used in forming the cohort models, so that the noise in those samples corresponds to the noise in the sample of the enrolling speaker's speech.

The noise generated by the noise generator 110 may then be passed to a noise addition block 112. The noise addition block may also receive the output of the Mel filter bank 104. The noise addition block 112 may then add the generated noise to the output of the Mel filter bank 104.

The output of the Mel filter bank with added noise may then be passed from the noise addition block 112 to a logarithm computation block 114. The logarithm computation block may compute a logarithm of the output of the Mel filter bank with added noise.

The logarithm of the output of the Mel filter bank with added noise may then be passed to a discrete cosine transform (DCT) block 116. The DCT block may then perform a DCT on the logarithm of the output of the Mel filter bank with added noise to compute the Mel frequency cepstral coefficients of the received sample.

The Mel frequency cepstral coefficients are then passed to a derivative computation block 118. The derivative computation block may compute the first and second order derivatives of the Mel frequency cepstral coefficients.

The Mel frequency cepstral coefficients, and the first and second order derivatives of the Mel frequency cepstral coefficients, form a feature vector.

The Mel frequency cepstral coefficients, and the first and second order derivatives of the Mel frequency cepstral coefficients are then passed to a feature normalization block 120. The feature normalization block 120 may then perform a normalization process on the received Mel frequency cepstral coefficients, and the received first and second order derivatives of the Mel frequency cepstral coefficients.

The output of the VAD 108 may be received by the feature normalization block 120, and the output of the VAD 108 may be used as part of the above described normalisation process. For example, the output of the VAD 108 may indicate which frames of the received sample contain speech, and thus if it is determined a frame contains no speech, the feature vector corresponding to said frame may be disregarded. As an alternative, frames that do not contain speech can be considered in the normalization, but then discarded before forming a feature vector representing the speech.

The feature normalization block 120 may then output a normalised MFCC feature vector.

In other embodiments, the noise generation, and noise addition, may be performed on the received sample initially (i.e. before the received sample has undergone any other processing in the feature extraction and noise addition block shown in FIG. 5). Thus, in this scenario, noise is added to the received sample, and the feature extraction process is subsequently performed on the received sample with added noise.

The noise may be added to the received sample in the time domain, or the noise may be added to the received sample in the spectral domain (for example, the noise may be added to the result of the fast Fourier transform, and the feature extraction process is subsequently performed on the result of the fast Fourier transform with added noise). The noise may be generated, and the noise may be added, to the received sample, at any point of the process performed by the system of FIG. 5.

The system of FIG. 5 may be configured to perform a different process to extract MFCC feature vectors from a received sample of a person's speech. The system of FIG. 5 may be configured to contain different or additional blocks to perform said different process. For example, the DCT block 116 may be replaced with an inverse fast Fourier transform (IFFT) block, where the IFFT block performs an IFFT on the output of the logarithm computation block 114.

In other embodiments, the system of FIG. 5 may be configured to extract other features suitable for speaker recognition from a received sample of a person's speech. Other features may include, for example, Linear Prediction Coefficients (LPC), Perceptual Linear Prediction (PLP), Power Normalised Cepstral Coefficients, and others. The system of FIG. 5 may contain different or additional blocks as required to extract other features suitable for speaker recognition from a received sample of a person's speech. For any configuration of the system of FIG. 5, the noise may be generated, and the noise may be added, to the received sample, at any point of the process performed by the system of FIG. 5.

Thus, in the system of FIG. 3, the feature extraction and noise addition block 36 extracts features of the sample with increased noise. As described above, the features that are extracted by the integrated feature extraction and noise addition block 36 may be any features suitable for use in a speaker recognition process. Examples of features include Mel Frequency Cepstral Coefficients (MFCC), Linear Prediction Coefficients (LPC), Perceptual Linear Prediction (PLP), Power Normalized Cepstral Coefficients, and others. As described above, the noise may be generated, and the noise may be added, to the received sample at any step in the process performed by the integrated feature extraction and noise addition block 36.

Thus, in step 88 of the process of FIG. 4, if the estimated noise measure meets the predetermined criterion, the system of FIG. 3 adds noise to the received sample to form a sample with increased noise.

In step 90 of the process of FIG. 4, the system of FIG. 3 extracts features of the sample with increased noise. As described above, steps 88 and 90 can be performed in any order.

The feature extraction and noise addition block 36 then passes the extracted features of the sample with increased noise to the model formation block 38. The model formation block 38 will form a model of the person's speech from the extracted features.

Thus, in step 92 of the process of FIG. 4, the system of FIG. 3 forms a model of the person's speech from the extracted features.

The model of the person's speech is then passed to a cohort model storage block 40, where the model is stored. Typically, the system of FIG. 3 may be configured to perform a cohort generation process for a plurality of people to obtain respective models of those people's speech. The plurality of models of those people's speech may then be passed to the cohort model storage block 40, where the plurality of models are stored.

By way of an example, the system of FIG. 3 is configured to obtain a plurality of models corresponding to the speech of a plurality of people, obtain a model of an enrolling user's speech, and perform speaker verification by comparing a received sample of speech with the model of the enrolling user's speech and with the respective models formed for said plurality of people.

The system of FIG. 3 may then be implemented in a device with speaker recognition functionality, as described above. In some embodiments, the device with speaker recognition functionality is provided with stored cohort models, and only the processes of obtaining the model of the enrolling user's speech, and performing speaker verification, are performed in the device itself. In that case, the device is preferable provided with information about the noise profile of the speech samples used for forming the cohort models, so that suitable noise may be added to the speech samples used for obtaining the model of the enrolling user's speech, and/or for performing speaker verification, as described below.

Certain functional blocks in the system of FIG. 3 may be configured to perform an enrolment process for an enrolling user, as described below.

As shown in FIG. 3, an input audio signal is received by the system of FIG. 3, and is passed to a noise estimator 50. The input audio signal may have been generated by a microphone, for example, one of the microphones in the smartphone 10. The input audio signal may represent a sample of a person's speech.

Thus, in step 80 of the process shown in FIG. 4, the system of FIG. 3 receives a sample of a person's speech.

The noise estimator 50 estimates a noise measure of the received sample of the person's speech. The noise estimator 50 may be configured to estimate any suitable noise measure in the received sample of the person's speech. Examples of suitable noise measures include an estimation of the noise signal itself, the absolute noise level, the signal-to-noise ratio (SNR), the absolute noise level in each of a plurality of frequency bands, and the SNR per band. The noise measure may be any combination of metrics or information related to the noise present in the received sample.

Thus, in step 82 of the process shown in FIG. 4, the system of FIG. 3 estimates a noise measure in the received sample of the person's speech.

The estimated noise measure is then passed to a thresholding gate 52. The thresholding gate 52 determines if the estimated noise measure meets a predetermined criterion. The predetermined criterion may be fixed, or the predetermined criterion may be modifiable. The predetermined criterion will be related to the type of noise measure that is estimated by the noise estimator 50. For example, if the noise measure is an absolute noise level, the predetermined criterion may be a threshold level, and the block 52 may determine whether the noise level is below the threshold level. As another example, if the noise measure is a signal-to-noise ratio, the predetermined criterion may again be a threshold level, and in this case the block 52 may determine whether the signal-to-noise ratio exceeds the threshold level. As another example, if the noise measure is the absolute noise level, or SNR, in each of a plurality of frequency bands, the predetermined criterion may again be a threshold level, or a respective threshold level for each frequency band, and the predetermined criterion may determine if the absolute noise level in every band is below the threshold level for that band. Alternatively, if the noise measure is the absolute noise level or SNR in each of a plurality of frequency bands, a respective threshold level may be set for each frequency band. A comparison may be made between the noise measure and the threshold level in every band, and the predetermined criterion may combine the results of these comparisons (for example weighting the results of the comparison in each band differently accordingly to the importance of that band in the task of speaker verification), and compare the combined result with a further threshold.

As a further example, if the noise measure is the absolute noise level in each of a plurality of frequency bands, the predetermined criterion may determine if a frequency profile of the noise in the received sample of the person's speech is similar to a predetermined known noise profile stored in a database that may contain multiple known noise profiles.

Thus, in step 84 of the process of FIG. 4, the system of FIG. 3 determines if the estimated noise measure meets a predetermined criterion. The criterion applied by the block 52 may be the same as the criterion applied by the block 32.

If the thresholding gate 52 determines that the estimated noise measure does not meet a predetermined criterion, the received sample of the person's speech is rejected. Again, the predetermined criterion applied by the thresholding gate 52 is generally set such that samples with unsuitable noise profiles are rejected. For example, the predetermined criterion may be set such that samples with generally excessive levels of noise, or with noise levels or types that cannot be masked effectively, meaning that later speaker verification would be difficult, are rejected.

Thus, in step 86 of the process of FIG. 4, if the estimated noise measure does not meet a predetermined criterion, the system of FIG. 3 rejects the received sample of the person's speech.

Thus, speech samples that do not meet the predetermined criterion, for example because they contain excessive amounts of noise or unusual types of noise, are rejected. The user may then be asked to provide a different sample of their speech, for use in enrolment.

If the thresholding gate 52 determines that the estimated noise measure meets the predetermined criterion, the received sample of the person's speech is passed to a voice biometrics block 54.

The voice biometrics block comprises a feature extraction and noise addition block 56, and a model formation block 58. The received sample of the person's speech is passed to the feature extraction and noise addition block 56, where noise is added to the received sample of the person's speech to form a sample with increased noise. The noise that is added to the received sample may be a predefined noise. The noise that is added to the received sample may be variable, depending on the absolute noise level in the received sample, or depending on the frequency profile of the noise in the received sample. The noise that is added to the received sample may be variable such that the sample with increased noise has a specific absolute noise level. The noise that is added to the received sample may be variable, depending on the signal level in the received sample and/or on the absolute noise level in the received sample, such that the sample with increased noise has a specific SNR. The noise that is added to the received sample may be variable such that the sample with increased noise has a specific frequency profile. When the predetermined criterion applied in step 84 determines whether a frequency profile of the noise in the received sample of the person's speech is similar to a predetermined known noise profile, the noise that is added to the received sample may be matched to that specific known noise profile. In general, the noise that is added will be complementary to the profile of the noise in the received sample. For example, in some embodiments, it may be considered desirable for the total noise to have a generally flat frequency spectrum. Then, if, for example, the input sample is obtained while the speaker is in a moving car, and the resulting noise has a very high noise level at low frequencies, and a low noise level at high frequencies, the noise that is added to the received sample may compensate for this by adding a noise profile that has a complementary spectrum, with low or no noise at low frequencies, and a higher noise level at high frequencies.

This addition of noise to the received sample will mask any low level background noise that is already present in the received sample. Thus, by adding the noise to the sample that is received by the system of FIG. 3 in an enrolment process, it can be arranged that the dominant background noise will be that added by the system of FIG. 3, and thus the noise type and noise level will be known). The feature extraction and noise addition block 56 may be configured to add noise to the received sample at any point in the feature extraction process that is performed by the block 56.

The feature extraction and noise addition block 56 may be configured such that it is comprises the same blocks and performs the same process as the integrated feature extraction and noise addition block 36. Specifically, the feature extraction and noise addition block 56 may be configured such that it comprises the same blocks and performs the same process as the system of FIG. 5 (as described above). This has the advantage that the noise profile of the speech sample used for user enrolment is effectively the same as the noise profile of the speech samples used for the cohort. This is advantageous because it means that a speech sample provided during verification will not be found to be similar to an enrolment (or, conversely, found to be similar to a cohort model and therefore dissimilar to an enrolment), simply because the noise profile in the verification sample is similar to the noise profile in one of the samples used either for forming the enrolment model or the cohort.

The integrated feature extraction and noise addition block 56 may be configured such that it comprises different blocks and/or performs a different process to the integrated feature extraction and noise addition block 36 and/or the system of FIG. 5 (as described above). However, in some embodiments, while the feature extraction and noise addition block 56 may comprise the same blocks and perform generally the same process as the integrated feature extraction and noise addition block 36, the noise that is added will typically be different, as the general aim is to add noise to the cohort samples and/or to the enrolment sample so that they have the same noise profile after the noise has been added.

Thus, in the system of FIG. 3, the feature extraction and noise addition block 56 extracts features of the sample with increased noise. As described above, the features that are extracted by the integrated feature extraction and noise addition block 56 may be any features suitable for use in a speaker recognition process. Examples of features include Mel Frequency Cepstral Coefficients (MFCC), Linear Prediction Coefficients (LPC), Perceptual Linear Prediction (PLP), Power Normalized Cepstral Coefficients, and others. As described above, the noise may be generated, and the noise may be added, to the received sample at any step in the process performed by the integrated feature extraction and noise addition block 56.

Thus, in step 88 of the process of FIG. 4, if the estimated noise measure meets the predetermined criterion, the system of FIG. 3 adds noise to the received sample to form a sample with increased noise.

In step 90 of the process of FIG. 4, the system of FIG. 3 extracts features of the sample with increased noise. As described above, steps 88 and 90 can be performed in any order.

The feature extraction and noise addition block 56 then passes the extracted features of the sample with increased noise to the model formation block 58. The model formation block 58 will form a model of the person's speech from the extracted features. As described above, the model is formed from one sample of the user's speech. However, a plurality of samples may be provided by the enrolling user, either at the time of initial enrolment and/or subsequently, and the model formation block 58 may then be configured to receive groups of extracted features from the plurality of samples to which noise has been added, and to form a model of the person's speech from the groups of extracted features.

Thus, in step 92 of the process of FIG. 4, the system of FIG. 3 forms a model of the enrolling user's speech from the extracted features.

The model of the person's speech is then passed to a user model storage block 60, where the model is stored.

The system of FIG. 3 may be configured to perform an enrolment process for a plurality of users to obtain respective models of those users' speech. The plurality of models of those users' speech may then be passed to the user model storage block 60, where the plurality of models are stored.

The system of FIG. 3 may further be configured, when the person is an enrolling user, to perform speaker verification by comparing a subsequently received sample of speech with the model of the enrolling user's speech.

By adding the noise to the received samples in both the cohort generation process and the enrolment process performed by the system of FIG. 3, the subsequently obtained cohort models and enrolling user models will have been obtained from received samples that contain a similar level of background noise (for example, the dominant background noise may be that added by the system of FIG. 3, and thus the noise type and noise level will be known). Thus, the cohort models and the enrolment models will be matched in terms of background noise level.

As described so far, it is assumed that the cohort models that are to be used in speaker verification are the same for each enrolled speaker, and that the user model obtained during enrolment is obtained by adding noise to the sample of the user's speech obtained during enrolment, and then extracting the required features of that speech sample.

An alternative possibility is that, during enrolment, a noise measure is estimated from the received sample of the enrolling person's speech. As before, it is then determined whether this meets the specified criterion meaning that the received sample is suitable for use. If it is suitable for use, noise is added to the voice samples that are intended to be used in forming the cohort models. The noise that is added to these samples may be chosen so that noise matching between the enrolment samples and the cohort samples is achieved. More specifically, the noise that is added to these cohort samples may be equivalent to the estimated noise in the enrolment samples. Alternatively, a database containing different types of noise may be provided, with the noise that is added to the cohort samples being selected from those stored in the database in order to match at least some characteristics of the estimated noise in the enrolment samples.

After adding the required noise to the voice samples that are intended to be used in forming the cohort models, the feature extraction and noise addition block 36 then passes the extracted features of each sample with increased noise to the model formation block 38. The model formation block 38 will form a model of each person's speech from the extracted features.

Thus, in this case, in step 92 of the process of FIG. 4, the system of FIG. 3 forms a model of the person's speech from the extracted features.

The model of each person's speech is then passed to a cohort model storage block 40, where the model is stored. Thus, the cohort generation process obtains respective models of multiple people's speech, and stores those models in the cohort model storage block 40. However, the models that are stored are based on samples to which noise has been added, where that noise is based on the noise contained in the samples obtained during a specific person's enrolment. As a result, the cohort models that are stored are specific to that specific person's enrolment.

In that case, it may be unnecessary to add noise to the samples obtained during that person's enrolment, before extracting the features of the sample and generating the model of the person's speech, because the matching of the noise is achieved by adding noise to the samples used for cohort generation. However, a further possibility is to achieve the matching of the noise by adding some noise to the samples used for cohort generation and adding some different noise to the samples obtained during enrolment, before extracting the respective features of the samples and generating the cohort models and the user model.

After enrolment of a user, a process of speaker verification is performed, by comparing a received speech sample with a model obtained during enrolment. Although not essential, in accordance with some aspects of this disclosure, noise may be added (in a similar way to that described above) to a received sample that is to be used for speaker verification.

Figure 6:
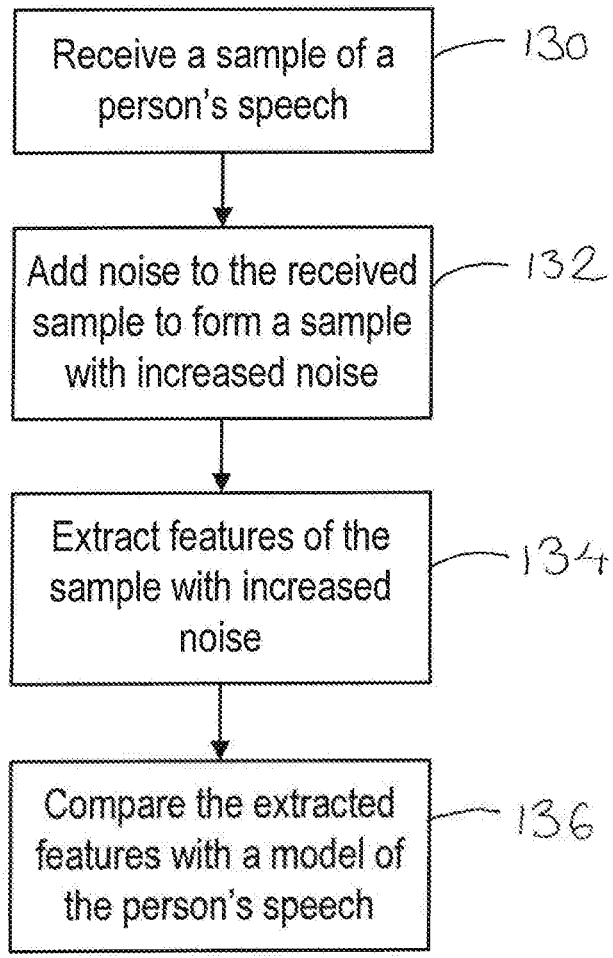
FIG. 6 is a flow chart, illustrating a second method.

FIG. 6 is a flow chart, illustrating a method for use in speaker verification.

Certain functional blocks in the system of FIG. 3 may be configured to perform a speaker verification process, as described below. This process may for example be performed when it is desired to determine whether a speaker is a previously enrolled user. For example, the process of speaker verification may be initiated when it is determined that speech detected by the microphone 12 contains a specific word or phrase (for example a trigger phrase or a particular command), and it is desired to determine whether the speaker is an enrolled user.

As shown in FIG. 3, an input audio signal is received by the system of FIG. 3, and is passed to a voice biometrics block 70. The input audio signal may have been generated by a microphone, for example, one of the microphones in the smartphone 10. The input audio signal may represent a sample of a person's speech.

Thus, in step 130 of the process shown in FIG. 6, the system of FIG. 3 receives a sample of a person's speech.

The voice biometrics block 70 comprises a feature extraction and noise addition block 72, and a T-Normalization verification block 74.

The received sample of the person's speech is passed to the feature extraction and noise addition block 72, where noise is added to the received sample of the person's speech to form a sample with increased noise. The noise that is added to the received sample may be a predefined noise. The noise that is added to the received sample may be variable, depending on the absolute noise level in the received sample, or depending on the frequency profile of the noise in the received sample. The noise that is added to the received sample may be variable such that the sample with increased noise has a specific absolute noise level. The noise that is added to the received sample may be variable, depending on the signal level in the received sample and/or on the absolute noise level in the received sample, such that the sample with increased noise has a specific SNR. The noise that is added to the received sample may be variable such that the sample with increased noise has a specific frequency profile. The noise that is added to the received sample may be variable such that the sample with increased noise has a frequency profile that is matched to the noise profile of the cohort samples that are used to form the cohort models and/or to the noise profile of the enrolment sample that is used to form the speaker enrolment model.

The feature extraction and noise addition block 72 may be configured such that it comprises the same blocks and performs the same process as the feature extraction and noise addition block 36. Additionally, or alternatively, the feature extraction and noise addition block 72 may be configured such that it comprises the same blocks and performs the same process as the feature extraction and noise addition block 56. More specifically, the feature extraction and noise addition block 72 may be configured such that it comprises the same blocks and performs the same process as the system of FIG. 5 (as described above). The integrated feature extraction and noise addition block 72 may be configured such that it comprises different blocks and/or performs a different process to the integrated feature extraction and noise addition block 36 and/or the integrated feature extraction and noise addition block 56 and/or the system of FIG. 5 (as described above).

Thus, in the system of FIG. 3, the feature extraction and noise addition block 72 extracts features of the sample with increased noise. As described above, the features that are extracted by the integrated feature extraction and noise addition block 72 may be any features suitable for use in a speaker recognition process. Examples of features include Mel Frequency Cepstral Coefficients (MFCC), Linear Prediction Coefficients (LPC), Perceptual Linear Prediction (PLP), Power Normalized Cepstral Coefficients, and others. As described above, the noise may be generated, and the noise may be added, to the received sample at any step in the process performed by the feature extraction and noise addition block 72.

Thus, in step 132 of the process of FIG. 6, the system of FIG. 3 adds noise to the received sample to form a sample with increased noise. In step 134 of the process of FIG. 6, the system of FIG. 3 extracts features of the sample with increased noise. As described above, steps 132 and 134 can be performed in any order.

This addition of noise to the received sample will mask any low level background noise that is already present in the received sample. Thus, by adding the noise to any sample received by the system of FIG. 3 in a speaker verification process, it can be arranged that the dominant background noise in the sample will be that added by the system of FIG. 3, and thus the noise type and noise level will be known). As a result of this, the received samples that are used in the speaker verification process, the cohort models, and the enrolling user models, will all be matched in terms of level of background noise. This may be a matching of absolute background noise level, or a matching of SNR. This matching will result in both a good calibration (as described above), and will also improve the accuracy of the speaker verification process. The noise that is added could be of a predetermined form, or could be matched to the noise profile measured from the sample of speech used in enrolling that specific user. The noise that is added could take account of the noise present in the received sample, so that the total of the original present noise plus the added noise has the desired level or the desired noise profile.

In this embodiment, the extracted features of the sample with increased noise are then passed to the T-Normalization verification block 74, although it will be appreciated that any form of normalization may be used. The T-Normalization verification block 74 also receives any user model(s) stored in the user model storage block 60. In the case where T-Normalization is used, the verification block 74 may also receive the models stored in the cohort model storage block 40.

T-Normalization is a score normalization technique for the numerical value indicative of the likelihood generated in speaker verification processes. The numerical value indicative of a likelihood may indicate a likelihood that the sample received during a speaker verification process was provided by the same person that provided samples during the enrolment process. In score normalization techniques, the "initial" numerical value indicative of likelihood is normalized relative to a set of speaker models, where the set of speaker models do not include the model which the numerical value indicative of likelihood was generated with respect to.

In general terms, in T-Normalization, an incoming speech signal is compared with a claimed speaker model (where indication of the identity of the speaker of the incoming speech signal has been provided), and the incoming speech signal is also compared with a set of "impostor" models (i.e. different speaker models to the claimed speaker model). The selection of the set of "impostor" models may be based on the claimed speaker model. This comparison of the incoming speech signal with the set of impostor models is then used to estimate an impostor score distribution.

The mean and standard deviation of the impostor score distribution can be calculated, and these values can be used to normalize the numerical value indicative of the likelihood generated by comparison of the incoming speech signal with the claimed speaker model.

Specifically, if it is desired to determine whether the received speech sample was spoken by an enrolled user, the sample is compared against the user model of the enrolled user to obtain a score s. Also, the sample is compared against the multiple models of the other speakers forming the cohort, and corresponding scores are obtained. Statistics of these scores are derived, for example the mean $\mu$ and standard deviation $\sigma$. A normalized score s' for the sample is then calculated as $s'=(s-\mu)/\sigma$.

Thus, the T-Normalization verification block 74 may compare the extracted features of the sample with increased noise (received from the integrated feature extraction and noise addition block 72) with a model of a person's speech received from the user model storage block 60. The T-Normalization verification block 74 may generate a numerical value indicating a likelihood that the extracted features of the sample with increased noise were provided by the same person who provided the speech sample(s) to generate said model in the enrolment process (as described above). The numerical value indicative of the likelihood may be for example a log likelihood ratio (LLR). The T-Normalization verification block 74 will then use the generated numerical value indicative of the likelihood to generate and output an authentication decision. This authentication decision will indicate whether the speaker who has provided the samples that were used in the speaker verification process has been successfully verified or not.

In an embodiment where the verification block 74 does not use T-Normalization to normalize the numerical value indicative of the likelihood, the verification block 74 may not receive the cohort models stored in the cohort model storage block 40. In such an embodiment, the system of FIG. 3 may not perform the cohort generation process as described above. In that case, the addition of noise as described above may take place during enrolment and verification, or during enrolment only.

In any event, the verification block 74 will then use the generated (and possibly normalized) numerical value indicative of the likelihood to generate and output an authentication decision. This authentication decision will indicate whether the speaker who has provided the samples that were used in the speaker verification process has been successfully verified or not.

In this embodiment, it is not estimated if a noise measure in the received sample of the person's speech (where the received sample of the person's speech is to be used in a speaker verification process) meets a predetermined criterion. However, the noise measure of the received sample may be estimated, and the received sample may be rejected if the noise measure does not meet a predetermined criterion, in the same manner as described previously.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A method for use in speaker verification, comprising:
for each person of a plurality of people forming a cohort:
receiving a sample of the person's speech;
estimating a noise measure in the received sample of the person's speech;
if the estimated noise measure does not meet a predetermined criterion, rejecting the received sample of the person's speech; and
if the estimated noise measure meets the predetermined criterion:
adding noise to the received sample to form a sample with increased noise;
extracting features of the sample with increased noise; and
forming a model of the person's speech from the extracted features, and further comprising:
for an enrolling user:

receiving a sample of the enrolling user's speech;
estimating a noise measure in the received sample of the enrolling user's speech;
if the estimated noise measure does not meet a predetermined criterion, rejecting the received sample of the enrolling user's speech; and
if the estimated noise measure meets the predetermined criterion:
adding noise to the received sample to form a sample with increased noise;
extracting features of the sample with increased noise; and
forming a model of the enrolling user's speech from the extracted features,
such that the models of the speech of the people forming the cohort, and the model of the enrolling user's speech can be used in a speaker verification.

2. A method according to claim 1, wherein adding noise to the received sample to form a sample with increased noise and extracting features of the sample with increased noise comprise:
adding noise to the received sample; and
subsequently performing a feature extraction process on the received sample with added noise.

3. A method according to claim 1, wherein adding noise to the received sample to form a sample with increased noise and extracting features of the sample with increased noise comprise:
performing a fast Fourier transform on the received sample;
adding noise to a result of the fast Fourier transform; and
subsequently performing a feature extraction process on the result of the fast Fourier transform with added noise.

4. A method according to claim 1, wherein adding noise to the received sample to form a sample with increased noise and extracting features of the sample with increased noise comprise:
performing a fast Fourier transform on the received sample;
applying a result of the fast Fourier transform to a Mel filter bank;
adding noise to an output of the Mel filter bank; and
subsequently performing a feature extraction process on the output of the Mel filter bank with added noise.

5. A method according to claim 1, further comprising:
performing speaker verification by comparing a received sample of speech with the models of the speech of the people forming the cohort, and the model of the enrolling user's speech.

6. A method according to claim 5, comprising performing speaker verification by:
adding noise to the received sample of speech to form a speech sample with increased noise; and
comparing said speech sample with increased noise with the models of the speech of the people forming the cohort, and the model of the enrolling user's speech.

7. A method according to claim 1, wherein said noise measure is an absolute noise measure.

8. A method according to claim 7, wherein said absolute noise measure is a total absolute noise level.

9. A method according to claim 7, wherein said absolute noise measure is a measure of noise in a plurality of frequency bands.

10. A method according to claim 1, wherein said noise measure is a signal to noise ratio.

11. A method according to claim 1, wherein adding noise to the received sample comprises:
adding a predetermined form of noise.

12. A method according to claim 1, wherein adding noise to the received sample comprises:
adding noise in a form that depends on the received sample of the person's speech.

13. A method according to claim 12, wherein adding noise to the received sample comprises:
adding noise in a form that depends on a frequency spectrum of the received sample of the person's speech.

14. A method according to claim 12, wherein adding noise to the received sample comprises:
adding noise in a form that depends on a measure of energy of the received sample of the person's speech.

15. A method according to claim 1, comprising performing the method for a plurality of people to obtain respective models of those people's speech, wherein adding noise to each received sample comprises:
receiving a sample of an enrolling user's speech; and
estimating a noise measure in the received sample of the enrolling user's speech, and
wherein the noise added to each received sample is determined based on the estimated noise measure in the received sample of the enrolling user's speech.

16. A device comprising:
an input for receiving a speech sample; and
a processor configured for performing a method according to claim 1.

17. A computer program product, comprising a tangible computer-readable medium, containing stored instructions for causing a programmed processor to perform a method according to claim 1.

* * * * *